United States Patent [19]

Cloeren

[11] Patent Number: 5,423,668
[45] Date of Patent: Jun. 13, 1995

[54] WEB THICKNESS CONTROL

[75] Inventor: Peter F. Cloeren, Orange, Tex.

[73] Assignee: The Cloeren Company, Orange, Tex.

[21] Appl. No.: 123,602

[22] Filed: Sep. 17, 1993

Related U.S. Application Data

[62] Division of Ser. No. 876,492, Apr. 30, 1992, Pat. No. 5,259,747.

[51] Int. Cl.$^6$ .............................................. B29C 47/16
[52] U.S. Cl. .................................. 425/141; 264/40.6; 425/143; 425/466
[58] Field of Search ................ 425/141, 143, 144, 466, 425/378.1; 264/40.6

[56] References Cited

U.S. PATENT DOCUMENTS

| | | |
|---|---|---|
| 2,938,231 | 5/1960 | Lowey, Jr. |
| 3,680,189 | 8/1972 | Noren. |
| 3,700,028 | 10/1972 | Noren. |
| 3,714,981 | 2/1973 | Noren. |
| 3,761,553 | 9/1973 | Richardson. |
| 3,767,346 | 10/1973 | Mihalik. |
| 3,920,365 | 11/1975 | Mules. |
| 3,940,221 | 2/1976 | Nissel. |
| 4,034,952 | 7/1977 | Stewart. |
| 4,125,352 | 11/1978 | Gellert. |
| 4,252,519 | 2/1981 | Farmer et al. |
| 4,281,980 | 8/1981 | Hoagland et al. |
| 4,332,543 | 6/1982 | Fulton et al. |
| 4,338,068 | 7/1982 | Suh et al. |
| 4,373,132 | 2/1983 | Vartanian. |
| 4,387,762 | 6/1983 | Rinderle. |
| 4,389,002 | 6/1983 | Devellian et al. |
| 4,454,084 | 6/1984 | Smith et al. .......... 425/144 |
| 4,500,279 | 2/1985 | Devellian et al. |
| 4,514,348 | 4/1985 | Iguchi et al. .......... 425/141 |
| 4,726,752 | 2/1988 | VanDun. |
| 4,753,587 | 6/1988 | Djordjevic et al. .......... 425/141 |
| 4,781,562 | 11/1988 | Sano et al. .......... 425/141 |
| 4,863,361 | 9/1989 | Boos. |
| 5,020,984 | 6/1991 | Cloeren et al. .......... 425/141 |
| 5,051,082 | 9/1991 | Hattori et al. |
| 5,208,047 | 5/1993 | Cloeren et al. |
| 5,229,140 | 7/1993 | Crass et al. .......... 425/141 |
| 5,259,747 | 11/1993 | Cloeren .......... 425/141 |

FOREIGN PATENT DOCUMENTS 58-65631  4/1983  Japan.
61-132320 6/1986  Japan.

OTHER PUBLICATIONS

"Heat Transfer Technologies (Heat Pipe)", *Kirk-Othmer: Encyclopedia of Chemical Technology*, vol. 12, pp. 191-202 (Third Edition, 1980).

Operation Manual of Jyohoku Seikosho Co., Ltd (Jan. 1991).

*Primary Examiner*—Jay H. Woo
*Assistant Examiner*—Joseph Leyson
*Attorney, Agent, or Firm*—Timothy R. Kroboth

[57] ABSTRACT

An improved apparatus providing for uniformity of web thickness is disclosed. In one aspect, the apparatus includes a plurality of gap-controlling, thermal energy sources, and in heat-exchange communication with the thermal energy sources, an assembly for compensating for temperature variation proximate to the thermal energy sources and across the apparatus width. The thermal compensating assembly includes a heat exchange jacket, and in combination therewith, a heat-exchanging, working fluid that undergoes a phase change in performing its heat exchange function.

17 Claims, 5 Drawing Sheets

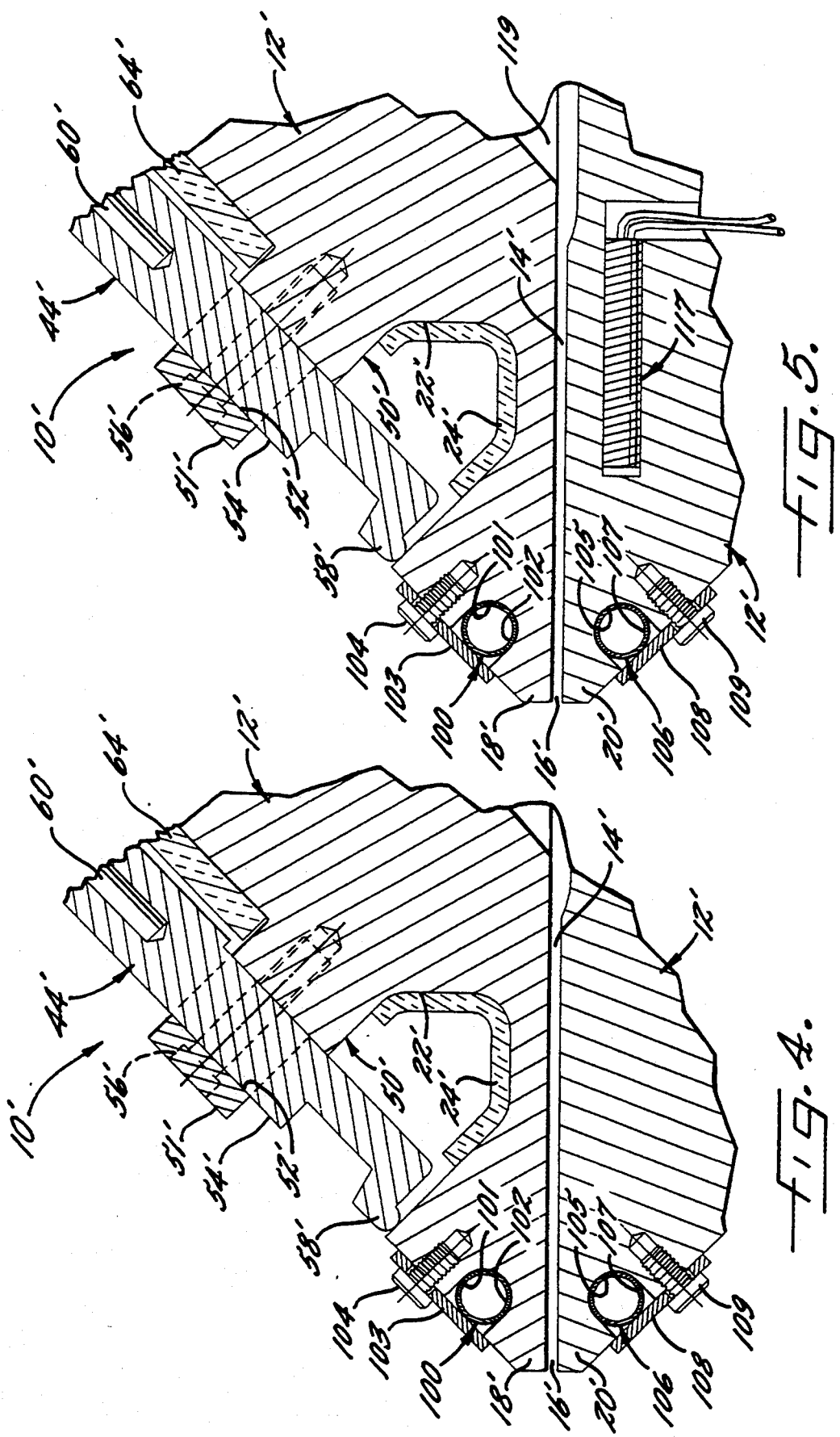

5,423,668

WEB THICKNESS CONTROL

This is a division of application Ser. No. 07/876,492 filed on Apr. 30, 1992, now U.S. Pat. No. 5,259,747, issued on Nov. 9, 1992.

BACKGROUND OF THE INVENTION

This invention relates to an improved apparatus for making a web of uniform thickness across the web width.

As illustrated by U.S. Pat. No. 3,767,346 to Mihalik, an apparatus having a plurality of short heat exchangers movably mounted in a groove in a lip of the apparatus for movement along the length of the lip, for varying the lip temperature at very small selected areas, is known. The heat exchangers include inlet and outlet conduits for a medium such a oil which may be recirculated to its source for heating or cooling. The apparatus also includes manually-operated, lip gap adjustment members.

In addition, as exemplified by U.S. Pat. Nos. 3,761,553 to Richardson, 3,920,365 to Mules, and 4,332,543 to Fulton et al, an apparatus having a plurality of thermal energy sources disposed across the width of an apparatus, and providing for localized changes in web thickness based upon localized viscosity changes, is known. The web thickness is decreased or increased in response to induced localized thermal gradients. The Richardson apparatus also includes manually-operated, lip gap adjustment members.

As illustrated by U.S. Pat. Nos. 2,938,231, 3,940,221, 4,281,980, 4,252,519 to Farmer et al, and 4,726,752, by U.S. Pat. No. 5,020,984 to Cloeren, and by EP Application No. 383,418, an apparatus having a plurality of lip gap-controlling, thermal energy sources spaced apart across the width of the apparatus, and providing for thermally-controlled, lip gap adjustment, is known. The lip gap is narrowed or widened in response to thermal expansion or contraction to provide uniformity of web thickness.

In the type of apparatus exemplified by the '221 patent, an individual cooling means is associated with each lip gap, adjustment assembly. According to the Farmer et al patent, a problem with the '221 apparatus is that of "stick-slipping" that is, when a resistance threshold has been overcome, moving suddenly by an amount that may well be excessive.

In the type of apparatus illustrated by the Farmer et al patent, the lip gap is adjusted by temperature adjustment means disposed within a die blade. Contrary to for instance the Richardson patent, which induces localized thermal gradients in the lip, the Farmer et al patent prevents temperature variations from affecting the melt temperature as the melt exits the die, and to this end, is based upon a transversely disposed passage adapted to circulate a heat transfer liquid, as a heat barrier means. The passage is located within the die blade between the temperature adjustment means and the blade lip, so as to maintain the blade lip at a constant temperature (col. 2, lines 33–39). The '980 apparatus includes a heat barrier means for circulating of a cooling medium.

In the type of apparatus exemplified by U.S. Pat. No. 4,726,752 and the Cloeren Patent, common cooling of several lip gap adjustment members is provided to level out various temperature influences including external air currents. In the '752 patent, a cooling medium is forced perpendicular to the adjustment members through channels provided in a cooling block that surrounds the adjustment members. Collectors for supply and discharge of the cooling medium are in fluid communication with the channels. Two sets of channels having opposite flow, may be used.

The EP Patent Application illustrates an extrusion apparatus having an intake/exhaust jacket formed with air passages. Cooling air in the jacket directly impinges upon heaters external to the lip gap adjustment members.

As exemplified by U.S. Pat. No. 4,863,361 to Boos, an apparatus having a width-controlling deckle, may include conventional lip heating elements along the lip length. According to the Boos patent, considerable energy is wasted in flowing cooling air around thermally-responsive, lip gap adjustment members.

Accordingly, it may be understood that different approaches have been used to provide an improved apparatus providing uniformity of web thickness. However, these prior efforts continue to be unsatisfactory.

Thus, there continues to be a need for an improved apparatus, and in particular for an improved extrusion apparatus, providing for uniformity of web thickness. Advantageously, thermally-controlled, lip gap adjustment would be improved, and there would be improved consistency in responsiveness to the gap-controlling, thermal energy sources, and faster response time in effecting lip gap adjustment. Moreover, such an improved apparatus would produce a web of given thickness uniformity with reduced lip deformation and reduced lip gap adjustment.

SUMMARY OF THE INVENTION

It is accordingly an object of the present invention to provide an improved apparatus providing for uniformity of web thickness.

It is a further object to provide an apparatus that provides for improved thermally-controlled, lip gap adjustment.

It is a still further object to provide an apparatus that would provide improved consistency in responsiveness to gap-controlling, thermal energy sources.

It is an even further object to provide an apparatus that provides for rapid thermally-controlled, lip gap adjustment.

It is an additional object to provide an apparatus that produces a web of given thickness uniformity with reduced lip deformation and reduced lip gap adjustment.

Additional object, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an apparatus including a lip forming an exit opening or slot which extends along the width of the apparatus.

Beneficially, in a first aspect of the present invention, the apparatus includes an exit opening control assembly for thermally-controlled adjustment of the exit opening gap. This control assembly includes spaced-apart, thermal energy sources operatively arranged to provide localized adjustment of the exit opening by expansion and contraction.

Preferably, the thermal energy sources include individual, independently-controllable, heating elements associated with temperature-responsive adjustment members or pushrods. An insulating member is located between a main body of the apparatus and the thermal energy sources.

Advantageously, the gap-controlling, thermal energy sources are in heat-exchange communication with an assembly for compensating for temperature variation proximate to the thermal energy sources and along the apparatus width. Preferably, the temperature variation-compensating assembly provides that the temperature proximate to the thermal energy sources is generally isothermal along the apparatus width. This assembly includes a heat exchange jacket. The heat exchange jacket is adapted to release excess heat emanating from the thermal energy sources, through its exterior surfaces.

The temperature variation-compensating assembly further includes, within the jacket and disposed along the width of the jacket, an element functioning as a heat source and heat sink. This element is beneficially a heat-exchanging, working fluid that undergoes a phase change in receiving heat and in releasing heat to provide the heat exchange, and that is enclosed within a chamber. This element is advantageously provided by a device known as a heat pipe.

Beneficially, in a second aspect of the present invention, an element analogous to the element disposed within the heat exchange jacket, is disposed at least partially within the lip of the apparatus and along its width. This element functions as a heat source and a heat sink proximate to the exit opening or lip gap. To this end, this element is preferably located as close as structurally possible to the lip gap, but in any case will generally be less than approximately two inches, in particular less than one inch, from the lip gap in order to negate temperature variation of the lip proximate to the lip gap. This element is again advantageously provided by a device known as a heat pipe.

This element reduces localized thermal gradients along the lip, and beneficially provides for the lip temperature to be substantially isothermal or normalized along the lip proximate to the lip gap. Such localized thermal gradients are caused by various temperature influences including variation in heat output of thermal energy sources, variation in the external air currents, and variation in lip temperature effect of heat sinks in heat exchange communication with the lip.

Contrary to the Farmer et al patent, this heat-exchanging element permits the mean lip temperature to change in response to the surrounding temperature influences. Thus, the mean lip temperature may increase or decrease as appropriate.

In the drawing and detailed description of the invention that follow, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

FIG. 4 is a partial cross-sectional view similar to that of FIG. 1, of a preferred extrusion apparatus in accordance with a second aspect of the present invention;

FIG. 5 is a partial cross-sectional view similar to that of FIG. 4, of a modification of the extrusion apparatus of FIG. 4.

DETAILED DESCRIPTION OF THE INVENTION

Figure 1:
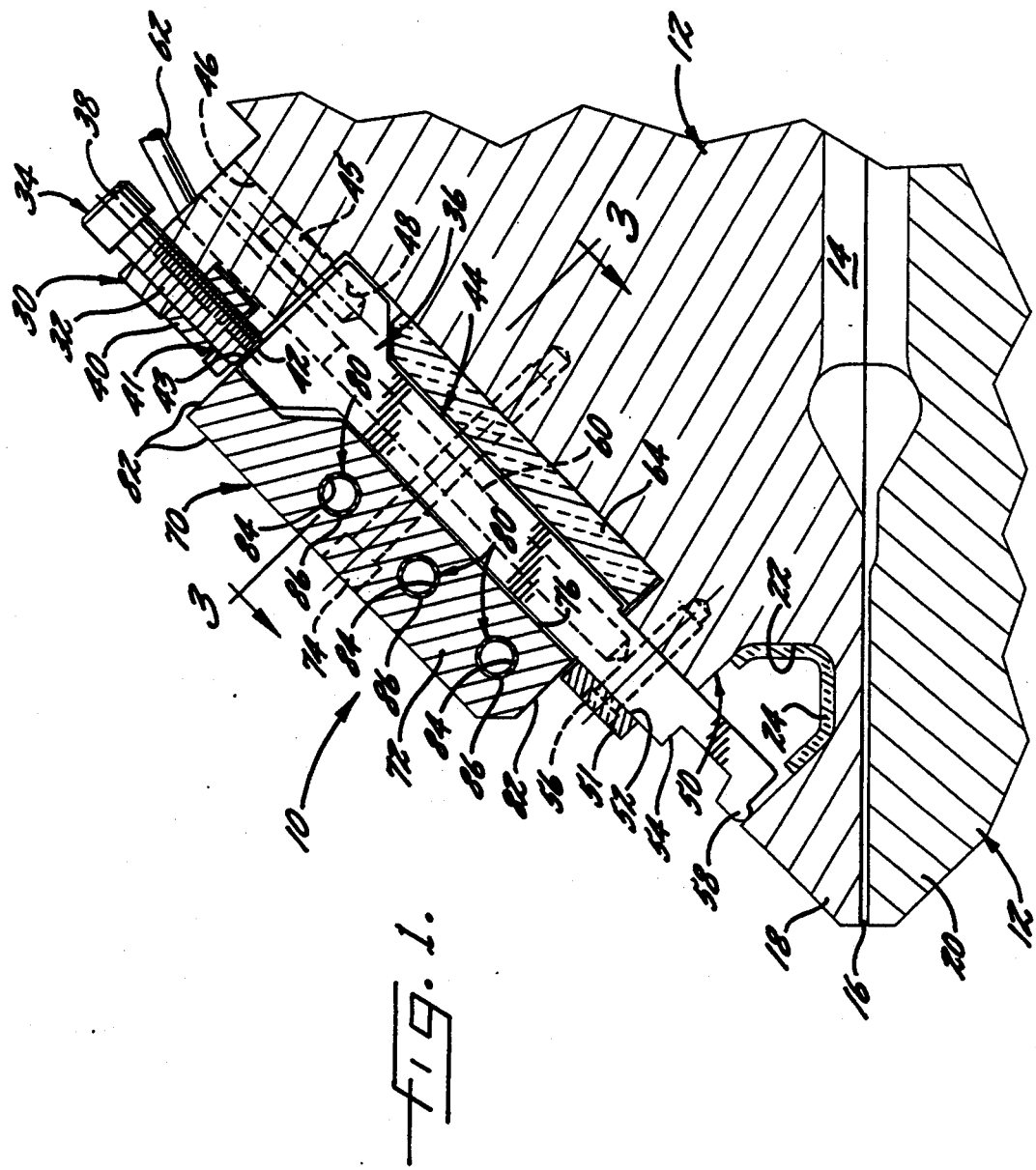
FIG. 1 is a partial cross-sectional view of a preferred embodiment of an extrusion apparatus in accordance with one aspect of the present invention.

The present invention is directed to a novel apparatus for manufacturing a web of uniform thickness, and can take the form of a straight slit extrusion die useful in processing a thermoplastic melt stream. The apparatus can be adapted for extrusion into an air space or onto a casting drum.

In a first aspect, the present invention provides for improved thermally-controlled, lip gap adjustment, in particular for improved consistency of responsiveness to the gap-controlling, thermal energy sources. In conceiving this aspect of the present invention, consideration was given to the gap-controlling, thermal energy sources typically being at different temperatures, that a temperature variation proximate to the thermal energy sources results across the apparatus width ("ambient temperature variation"), and that the ambient temperature variation produces a non-uniform or varied responsiveness to the gap-controlling, thermal energy sources, with respect to thermal responsiveness over time.

By this aspect of the invention, temperature variation in the proximity of the thermal energy sources is reduced across the apparatus width. As a result, control is beneficially simplified and consistency of responsiveness is improved. Moreover, an apparatus in accordance with this aspect of the present invention, is beneficially able to produce a web of uniform thickness with reduced energy input variation, and to provide a lower mean ambient temperature proximate to the thermal energy sources, and more rapid thermally-controlled, lip gap adjustment.

To achieve these benefits, it is not necessary that an isothermal condition be produced proximate to the thermal energy sources and across the apparatus width. Assume, for instance, an ambient temperature variation of about 25% and a compensating power level deviation of 34% on the low end to 66% on the high end, between the low and high power level inputs to the heat sources, in order to produce a web of uniform thickness. By reducing the ambient temperature variation to about 10% by use of a thermal compensating assembly in accordance with a first aspect of the present invention, the power level deviation may be reduced to approximately 45% to 55%, respectively, as a result of which the extent of power level adjustment is decreased. Furthermore, lip gap control for a given change will be more rapid for the power level deviation ranging from 45% to 55%. Accordingly, although the benefits increase as the invention more closely effects an isothermal condition proximate to the thermal energy sources, significant benefit results from reducing the normal ambient temperature variation to an about +/−5% variation, that is, in providing a generally or substantially isothermal condition.

In a typical apparatus having thermally-controlled, lip gap adjustment, thermal control is regulated, and localized expansion or contraction of the lip gap is provided, in response to measurement of the web thickness. The greater the power level deviation, the harder the adjusting system works to produce a web of uniform thickness. As a consequence, there is unnecessary working stress on the adjusting system of a typical prior art apparatus.

Figure 2:
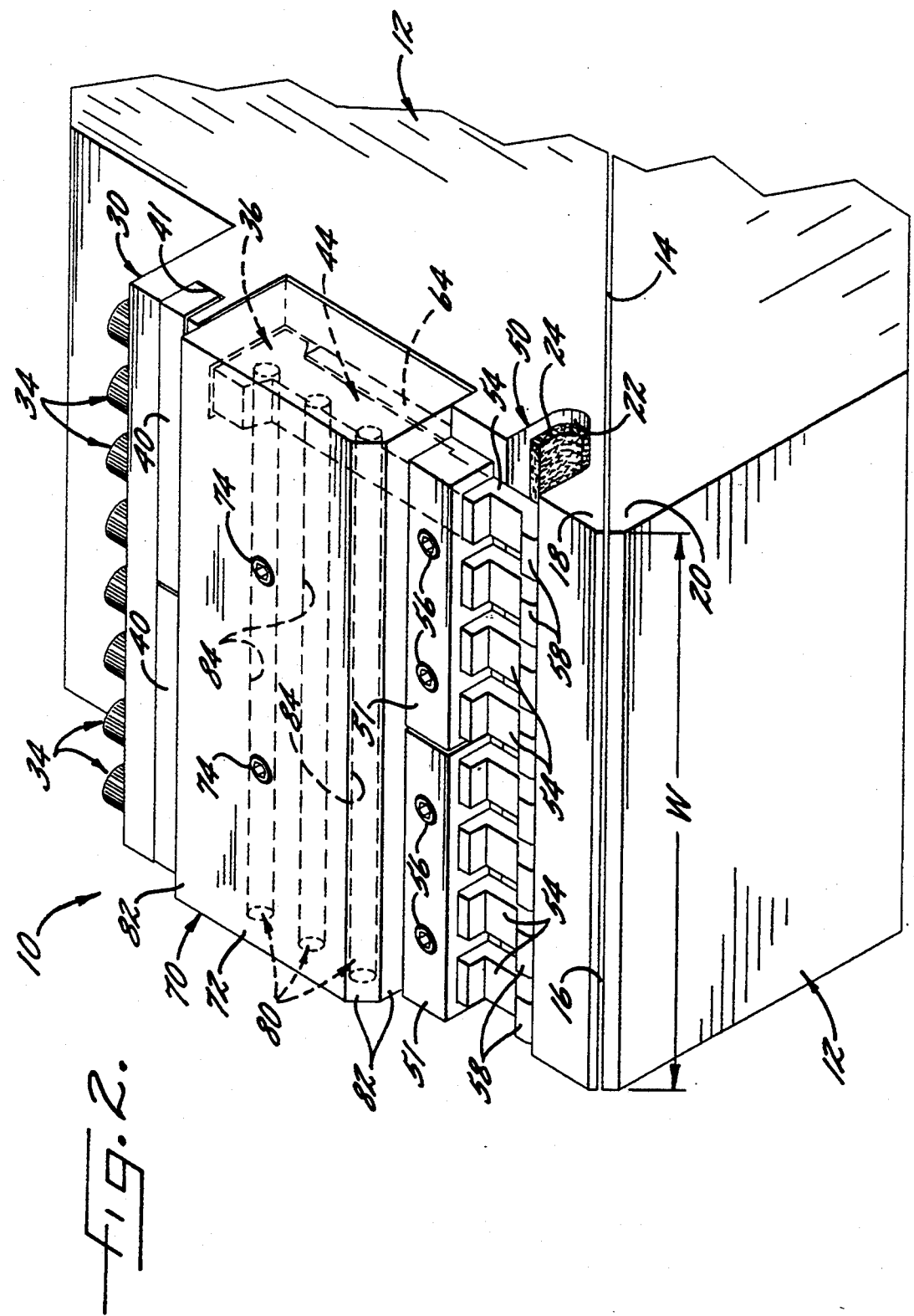
FIG. 2 is a partial perspective view of the extrusion apparatus of FIG. 1, with end plates removed.
Figure 3:
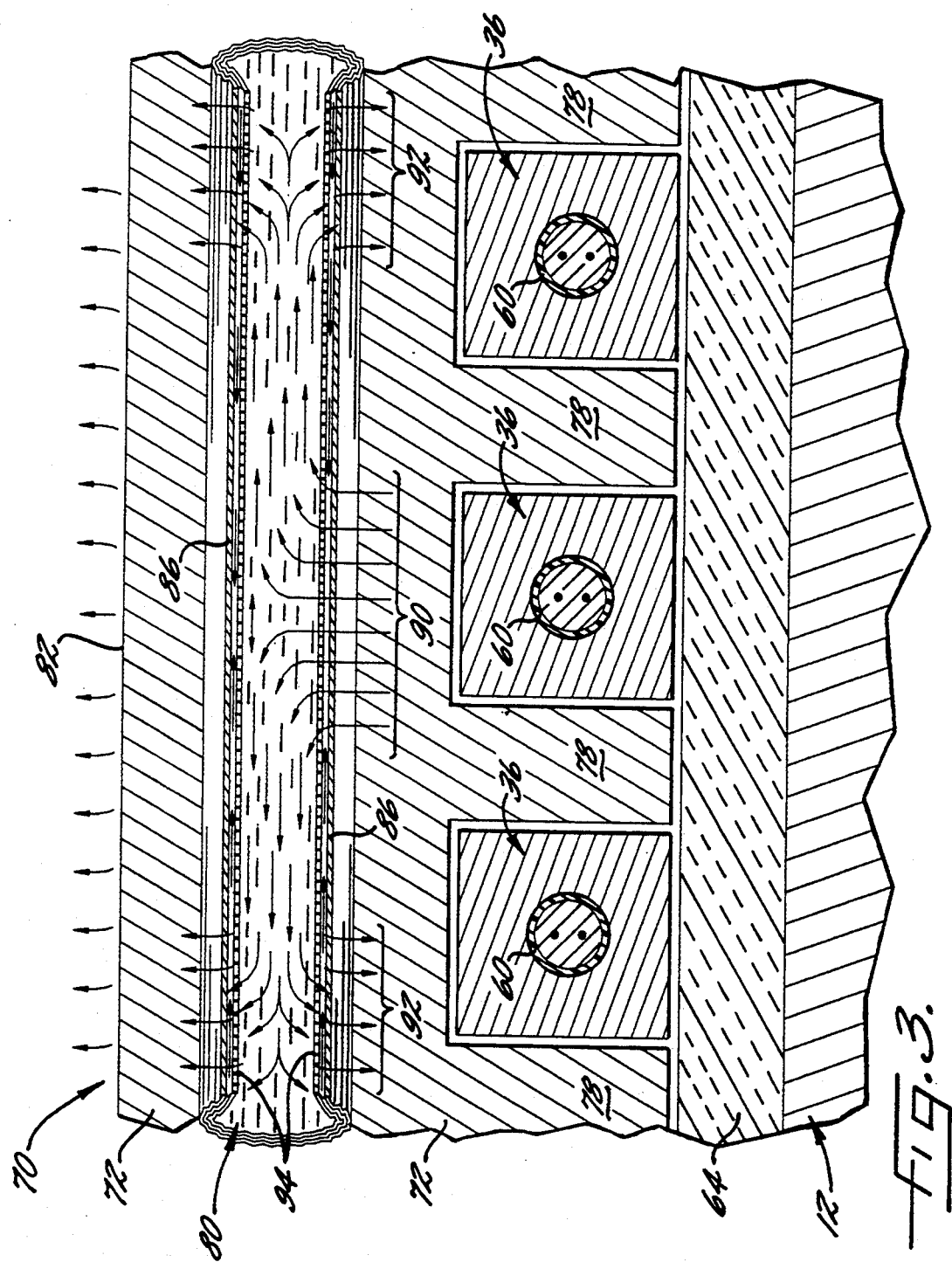
FIG. 3 is an enlarged, partial cross-sectional view taken substantially along line 3—3 of FIG. 1, showing further details of the apparatus including a schematic representation of the heat pipe operation.

Referring to FIGS. 1 to 3, a preferred embodiment of an extrusion apparatus 10 in accordance with a first aspect of the present invention, is shown. The apparatus includes a main body 12 having a flow passageway 14, which terminates in an exit slot 16 formed by lips 18,20. With particular reference to FIG. 2, exit slot 16 extends along substantially the entire apparatus width, designated by "W".

Lip 18 is beneficially flexible to the extent that it can be locally deformed by physical pressure to provide local adjustment of the gap of the exit slot. To this end, lip 18 has a necked down portion defined by a recess 22, which allows for localized flexing of the lip, thereby providing localized thickness control of the web. An insulating member 24 may be disposed in the recess.

With particular reference to FIG. 1, main body 12 has an extension 30 along its width which has a bore 32, through which an adjustment bolt 34 of a gap-adjusting, pushrod/adjustment assembly 36 extends. A head 38 of the bolt is engageable by a wrench for manual adjustment of the lip gap. A mid-portion of bolt 34 is in threaded engagement with a threaded member 40 inserted in a recess 41 in extension 30. A bolt end 42 engages an upper end 43 of a temperature-responsive pushrod 44 of pushrod/adjustment assembly 36. A guide pin 45 is inserted though a smooth throughbore 46 in extension 30, and into a recess 48 in upper end 43 of the pushrod.

Main body 12 also has an extension 50 along its width which combines with member 51 to form a smooth throughbore 52, through which a lower end 54 of the temperature-responsive pushrod extends. Fasteners 56 connect member 51 to main body 12. An operating end 58 of the pushrod is in contact with movable lip 18.

Beneficially, a cartridge heating element 60, which may be independently controllable, is disposed within pushrod 44. Relatively less thermal mass for a heating element and pushrod is advantageous. A power lead 62 for cartridge heating element 60 terminates in an electrical box (not shown), which is typically under automated control in response to gauges that measure the web thickness.

Heating element 60 is generally within a portion of the pushrod disposed between extensions 30,50. An insulating member 64 is beneficially located between the pushrod/heating element and main body 12 of the extrusion apparatus.

It will be appreciated that FIG. 1 shows only one pushrod/heater element assembly, and that many such gap-controlling assemblies are arranged in a predetermined spaced-apart relationship along the width of an apparatus in accordance with the present invention. A plurality of such assemblies are indicated in the view of FIG. 2.

With reference to FIGS. 1 and 2, the pushrods with associated heating elements are advantageously in heat exchange communication with an assembly 70 for compensating for temperature variation proximate to the pushrod/heater element assemblies. Assembly 70 includes a heat exchange jacket 72, which is fastened to main body 12 of the apparatus by threaded fasteners 74, and which has a lower surface 76 that lies in heat exchange communication with the pushrods. Jacket 72 beneficially has a width sufficient to cover the plurality of pushrod/heater element assemblies and that is generally the same as the width of slot 16 of extrusion apparatus 10. As best illustrated in FIG. 3, the lower surface of jacket 72 may have portions 78 which extend between the pushrods.

The heat exchange jacket is beneficially made of a highly thermal conductive material. Illustrative preferred materials include, but are not limited to, copper, aluminum, beryllium and titanium, and alloys thereof including copper alloys such as beryllium/copper alloy and brass, aluminum alloy and titanium alloy. A preferred material will typically have a thermal conductivity greater than that of iron or cast iron at a nominal operating temperature of about 300° C. or more. Thermally conductive, synthetic composites may also be used to form the heat exchange jacket.

As a result of its high thermal conductivity, the heat exchange Jacket assists in compensating for the ambient temperature variation. In this respect, assembly 70 includes, and the heat exchange jacket works in cooperation with, an element 80 disposed within the jacket and along its width. Element 80 efficiently and rapidly functions as both a heat source and a heat sink to provide for rapid thermal compensation proximate to beneficially all pushrod/heater element assemblies along the width of extrusion apparatus 10.

Preferably, exterior surfaces 82 of the heat exchange jacket are uninsulated, and the jacket removes excess heat emanating from the thermal energy sources. In this way, a lower mean ambient temperature may be provided proximate to the thermal energy sources, and faster responsiveness of the thermal energy sources provided. With reference to FIG. 3, arrows located above surface 82 indicate heat removal by the jacket.

This beneficial release of heat is provided by convection and radiation, and will be enhanced by a highly thermally emissive surface. To this end, it will typically be preferred, when the jacket material is oxidizable, for the jacket to have an oxidation-preventing, exterior surface. Accordingly, an aluminum jacket may preferably have anodized surfaces, and a copper or copper alloy jacket may preferably have nickel-plated surfaces.

To increase the removal of excess heat energy, an uninsulated jacket may have a finned exterior surface. In addition, a conventional blower for forcibly cooling the exterior surfaces of the jacket, may be used.

Suitably, jacket 72 includes several internal channels or cavities 84 along its width, and within each cavity, a heat-exchanging, working fluid conveniently enclosed in an individual containment structure or envelope 86 is disposed to collectively form element 80. Suitably, the entirety of each envelope 86 is disposed within jacket 72. However, the containment structure ends could extend beyond the jacket to increase removal of excess heat.

It will be understood that element 80 is beneficially provided by a device known as a heat pipe. Attention is invited to FIG. 3, which diagrammatically illustrates the operation of a heat pipe. An exemplary description of a heat pipe is now provided; however, those familiar with heat pipes will understand that appropriate design changes may be made as desired.

Each heat pipe shown in FIG. 1, is formed as a closed, evacuated chamber preferably having a containing wall constructed, as in the case of jacket 72, of a highly thermal conductive material. A particularly suitable envelope 86 is made of copper.

An illustrative thermal conductivity value for a heat pipe may be about 25 watts/cm.° C., whereas by comparison copper has a thermal value of about 4 watts/cm.° C. Heat pipes can be devised with a wide range of thermal conductivity values, with it being understood that a higher value would produce more rapid heat exchange. As indicated in the description that follows, the thermal value for a particular heat pipe will depend upon, for instance, the working fluid and wick material employed, and the working volume of the heat pipe.

Within closed, evacuated envelope 86, there is provided a heat exchange medium or working fluid in the form of a volatile liquid. The working fluid is beneficially selected to have a substantial vapor pressure, generally greater than about 20 mm Hg, at the minimum operating temperature, thus resulting in a pressurized chamber during operation, with it being understood that a higher value would beneficially result in greater heat energy transfer per unit time.

For high power throughput under typical operating conditions, the working fluid advantageously has a high latent heat of vaporization, high surface tension, high liquid and vapor densities, and low liquid and vapor viscosities. The wetting angle of the working fluid should be less than 10°. Suitable working fluids are within the skill of those familiar with heat pipes and include distilled or otherwise purified water, for a nominal operating temperature on the order of 300° C.

The working fluid absorbs heat in an area at a temperature above its evaporation temperature, i.e., at a heat input or evaporator area, depicted in FIG. 3 as 90. Each of these areas receives heat and an influx of the working fluid, and evaporates the working fluid at a rate proportional to its power input. Each such area operates independently of the others, but feeds a common vapor stream at a nearly common temperature and pressure.

Condensation of the vapor thus formed, occurs upon contact with any surface that is at a temperature below the evaporation temperature of the working fluid, i.e., at a heat output or condenser area, depicted in FIG. 3 as 92. Wick pumping may advantageously be used in the heat pipe to return the working fluid from condenser areas to evaporator areas by capillary action. Suitable wick materials are within the skill of those familiar with heat pipes, and include a capillary wick structure provided by wire mesh or screen, depicted in FIG. 3 as 94. Wickless heat pipes are also conventional.

In operation, the working fluid transfers heat energy between the condensation areas and evaporator areas, and undergoes a phase change in receiving heat and in releasing heat to provide the heat exchange. The temperatures of the condenser areas increase and the temperatures of the evaporator areas decrease, with a tendency toward a generally isothermal condition proximate to the pushrod/heater assemblies.

As can be understood, a preferred apparatus in accordance with a first aspect of the present invention, includes a plurality of gap-controlling, thermal energy sources spaced apart along the width of the apparatus and in heat exchange communication with a heat exchange jacket having a cavity disposed along its width and containing a heat-exchanging, working fluid. In this way, the inventive apparatus compensates for ambient temperature variation, provides for a lower mean ambient temperature proximate to the thermal energy sources, and provides for consistent, thermally-controlled adjustment of the lip gap along the entire width of the exit opening, with more rapid, lip gap adjustment.

In operation of extrusion apparatus 10, heat output of all heating elements 60 is set to a selected control value typically in the range of 40 to 60 percent of the full power value. This results in the mean power level input. Heat exchange jacket 72 and element 80 operate to compensate for the normal temperature variation proximate to the pushrod/heater assemblies and along the width of the apparatus, and to provide a lower mean ambient temperature.

Typically, the ambient temperature variation-reducing benefit of the heat jacket is limited by its thermal conductivity to compensating with respect to groups of pushrod/heater assemblies along the apparatus width, whereas, element 80 is able to provide for rapid compensation with respect to all pushrod/heater assemblies. Beneficially, the ambient temperature variation is reduced, and it is preferable that the temperature proximate to the pushrod/heater assemblies be substantially isothermal along the apparatus width. As a result, improved consistency and speed of responsiveness to the gap-controlling, thermal energy sources is provided for, and the adjusting system may produce a web of uniform thickness with less work and less lip gap adjustment. Thus, the overall response time for a given change is reduced.

Thereafter, the lip gap is manually adjusted to the required lip gap profile by rotation of the head 38 of each adjustment bolt 34 in the desired direction, and flow through the lip gap is commenced. Conventional gauges measure the web thickness and provide for increased or decreased heat output of appropriate heating elements 60 in order to produce appropriate localized changes in the lip gap to compensate for thickness variation in the web. Heat exchange jacket 72 and element 80 continue to exert their beneficial effects relative to this typically on-going adjustment. The pushrods expand and contract in response to the thermal environment. An improved thermally-controlled, lip gap adjustment results.

According to variants of this aspect of the invention, the working fluid may be disposed within cavity 84 without additional containment within envelope 86. Also, if too much heat loss were a consideration, exterior surfaces 82 of the heat exchange jacket might be covered by an insulating member.

In conceiving a second aspect of the present invention, consideration was given to multiple localized thermal gradients along an apparatus lip at the lip gap producing a web of uneven thickness as a result of localized thermally-influenced, surface viscosity effects across a stream width as the stream passes through the lip gap, and that localized thermal gradients may result from various temperature influences including variation in heat output of thermal energy sources used to provide localized web thickness change, variation in the ambient temperature external to the apparatus, and variation in axial heat output of a conventional elongated lip heater. Moreover, it was realized that conventional efforts to provide localized changes in the lip gap to correct the uneven thickness, at times exacerbated the non-uniformity of thickness by propagating surface viscosity effects resulting from increased localized thermal gradients.

In addition, it was realized that the mean lip temperature could be permitted to increase or decrease in response to the various systemic and environmental influences, and that as a result, energy inputted into a web thickness-controlling system could be conserved. Furthermore, it was realized that conventional efforts providing localized changes in the lip gap, often achieved uniformity of web thickness at the expense of a substantially distorted lip gap. Accordingly, it was conceived that reducing or eliminating the localized thermal gradients along the lip and proximate to the lip gap would overcome uneven web thickness with reduced lip gap adjustment.

In FIG. 4, a preferred embodiment of an extrusion apparatus 10' in accordance with the second aspect of the present invention, is shown. Apparatus 10' may be understood to be substantially identical to extrusion apparatus 10 except that an element 100 for reducing localized thermal gradients along a lip 18', is utilized, and thermal compensating assembly 70 of apparatus 10 is omitted. Accordingly, like parts have been designated with like numbers. It should, however, be understood that an apparatus in accordance with the present invention, could be provided by the combination of apparatus 10' and a thermal compensating assembly as described in connection with apparatus 10.

With reference to FIG. 4, beneficially disposed at least partially within a movable lip 18' and along its width, is element 100. Element 100 could be located completely within lip 18'. This element efficiently functions as a heat sink and heat source proximate to a lip gap 16' and advantageously between the lip gap and a cartridge heater 60'. Element 100 has the capacity to rapidly transfer thermal energy.

Beneficially, this element reduces not only the temperature variation typically found along the lip proximate to the lip gap but also the gap variation required for a given web thickness uniformity. Advantageously, the length of element 100 is substantially the same as the exit slot width, so that its beneficial effect may be provided for the entire exit slot.

However, excess heat energy may pass to movable or flex lip 18'. As a result, element 100 allows the mean temperature of the lip to change in response to any change, for instance an increase, in the mean heat output of the pushrod/heating element assemblies or in the ambient conditions under which the apparatus is operating. Accordingly, the mean temperature of the lip is permitted to become equal to the mean temperature of the thermal environment affecting the lip temperature. Thus, conception of this aspect of the present invention was also based upon it being realized that even though a heat pipe is a closed system having limitations as to the amount of heat energy it can handle per unit time, it could be usefully employed to reduce localized thermal energy gradients proximate to the lip gap.

Suitably, lip 18' includes a groove 101 along its width; and within the groove, a heat-exchanging, working fluid that undergoes a phase change in effecting heat exchange proximate to the lip gap, is enclosed in a chamber 102, to provide element 100. A retainer 103 or several such retainers, are used to secure the heat pipe to the lip, and fasteners 104 (only one shown) connect the retainer member to lip 18' of the apparatus.

Likewise, lip 20' beneficially includes a groove 105 along its width, and disposed within the groove an element 106 in the form of a heat-exchanging, working fluid enclosed in a chamber 107. Element 106 exerts a localized thermal gradient-reducing function with respect to lip 20'. Reference is made to the earlier description of an analogous heat pipe in connection with the first aspect of the present invention for details of suitable elements 100, 106. Retainer 108, and fasteners 109 (only one shown) serve the same purpose as retainer 103 and fasteners 104.

Referring to FIG. 5, an apparatus otherwise identical to that shown in FIG. 4, includes a plurality of elongated heater elements 117 (only one shown) disposed along the width of the apparatus for providing localized web thickness change. Like parts have been designated with like numbers.

Beneficially, heater elements 117 are located upstream of the lip gap, for instance in an area generally between the lip gap and a transverse flow-providing manifold 119 (seen more clearly in FIG. 6, where it is numbered as 219), and within main body 12' of the apparatus. Reference is made to the specification of U.S. Pat. No. 4,332,543, earlier discussed, for further details as to this type of heater element and the use thereof.

It will be understood that heater elements 117 may be used to provide web thickness control without thermal control of the lip gap adjustment as provided by heating elements 60'. Element 106 of this apparatus exerts a localized thermal gradient-reducing function proximate to lip 20' with respect to heater elements 117, similar to that provided by element 100 with respect to heating elements 60'.

Figure 6:
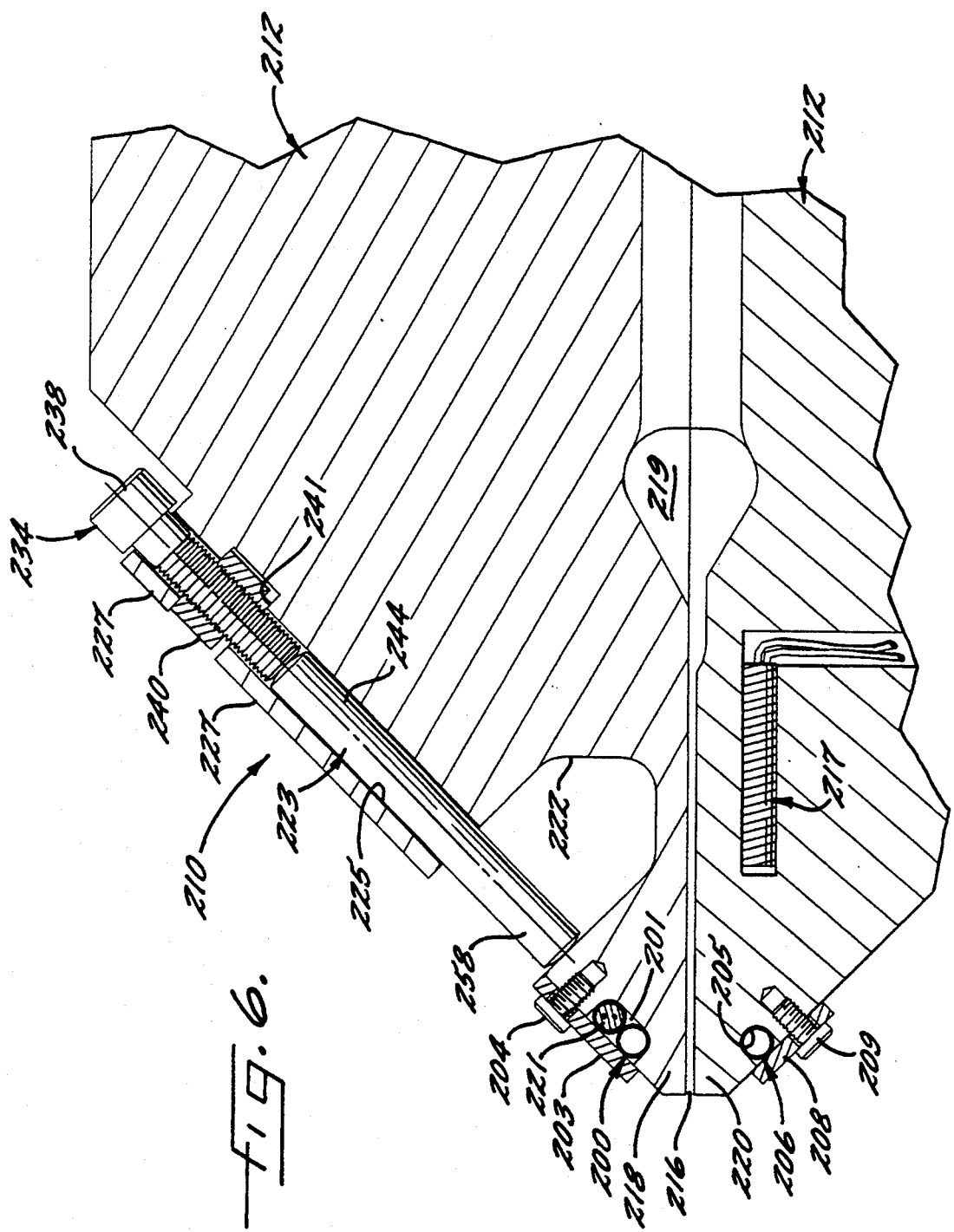
FIG. 6 is a partial cross-sectional view similar to that of FIG. 1, of another preferred extrusion apparatus in accordance with the second aspect of the present invention.

In FIG. 6, another preferred embodiment of an extrusion apparatus 210 in accordance with the second aspect of the present invention is shown. Apparatus 210 may be understood to be substantially identical to the apparatus of FIG. 5 except for a lip heater 221 provided in a lip 218, and a manually operated, lip gap control assembly 223 disposed in a smooth throughbore 225 in an extension 227 of main body 212 having a recess 241. Like parts have been designated with like numbers.

With reference to FIG. 6, beneficially disposed at least partially within movable lip 218 and along its width, is conventional electric lip heater 221 and an element 200 for reducing localized thermal gradients along the lip, and which is identical to element 100. Suitably, element 200 may be located between the lip gap and lip heater 219, but other locations may be used provided that the element is positioned to negate temperature variation of the lip proximate to the lip gap.

Beneficially, element 200 reduces not only the temperature variation typically found along the lip proximate to the lip gap when conventional lip heater 221 is used, but also the gap variation typically induced to overcome the effects of the temperature variation. Typically, the length of lip heater 221 is substantially the same as the width of the exit slot. Advantageously, the length of element 200 is also substantially the same as the width of the exit slot, so that its beneficial effects may be provided for the entirety of the lip heater.

As can be understood, a preferred apparatus in accordance with the second aspect of the present invention, includes disposed along the apparatus lip and proximate to the lip gap, a heat-exchanging, working fluid in an enclosed space which may be provided by a containment envelope. In this way, the inventive apparatus reduces localized thermal gradients proximate to the lip gap, and provides for reduced gap variation for a given web thickness uniformity, and for more rapid and consistent, thermally-controlled, lip gap adjustment.

With reference to FIG. 4, in operation of extrusion apparatus 10', heat output of all heating elements 60' is set to a selected control value typically in the range of 40 to 60 percent of the full power value. This results in the mean power level input. Element 100 operates to reduce localized temperature gradients along lip 18'. Preferably, this element provides for the lip temperature to be generally isothermal, that is, within a +/−5% variation depending on the nominal operating temperature, proximate to the lip gap. As a result, improved consistency and speed of responsiveness to the gap-controlling, thermal energy sources is provided for, and a web of uniform thickness may be produced with less work and less lip gap adjustment.

Thereafter, adjustment of lip gap 16' to the required lip gap profile is provided by rotation of the head of each adjustment bolt in the desired direction, and flow through lips 18',20' is commenced. Conventional gauges measure the web thickness and provide for increased or decreased heat output of appropriate heating elements 60' in order to produce appropriate localized changes in the lip gap to compensate for thickness variation in the web. Element 100 continues to exert its beneficial effects relative to this adjustment. An improved thermally-controlled, lip gap adjustment results.

Having described the invention in detail and by reference to preferred embodiments thereof, it will be apparent that modifications are possible without departing from the scope of the invention defined in the appended claims. Several modifications have been briefly mentioned for purposes of illustration.

I claim:

1. An apparatus comprising a main body comprising a lip forming an exit opening for extruding a web, means for web thickness change comprising a plurality of spaced-apart, thermal energy sources operatively arranged to provide localized adjustment of said exit opening, and in heat-exchange communication with said energy sources, a thermally conductive, heat exchange jacket, and disposed at least partially within said heat exchange jacket and in heat-exchange communication with said energy sources, heat pipe means, and insulating means disposed between said heat exchange jacket and said main body.

2. The apparatus of claim 1, wherein said heat exchange jacket comprises an uninsulated exterior surface for release of heat.

3. The apparatus of claim 1, wherein said energy sources comprise heating means, and said insulating means is an insulating member.

4. The apparatus of claim 3, said web thickness change means further comprising temperature-responsive pushrods, wherein said lip is deformable by physical pressure, wherein each of said pushrods has an operating end in engagement with said lip, and wherein said heating means are in heat-exchange communication with said pushrods.

5. The apparatus of claim 4, further comprising means for mechanically adjusting said pushrods, in engagement with said pushrods, and wherein said heating means are disposed within said pushrods.

6. The apparatus of claim 4, wherein said heat exchange jacket is made of a beryllium alloy.

7. The apparatus of claim 1, wherein said heat pipe means are disposed on an opposite side of said energy sources from said insulating means.

8. An apparatus comprising a main body comprising a lip forming an exit opening for extruding a web, means for web thickness change comprising a plurality of spaced-apart, thermal energy sources operatively arranged to provide localized adjustment of said exit opening, and in heat-exchange communication with said energy sources, a thermally conductive, heat exchange jacket comprising heat pipe means in the form of a plurality of channels disposed within said heat exchange jacket, each containing a heat-exchanging, working fluid, and insulating means disposed between said heat exchange jacket and said main body, wherein said heat pipe means are disposed on an opposite side of said energy sources from said insulating means.

9. The apparatus of claim 8, wherein said heat exchange jacket comprises an uninsulated exterior surface for release of heat.

10. The apparatus of claim 8, wherein said energy sources comprise heating means, and said insulating means is an insulating member.

11. The apparatus of claim 10, said web thickness change means further comprising temperature-responsive pushrods, wherein said lip is deformable by physical pressure, wherein each of said pushrods has an operating end in engagement with said lip, and wherein said heating means are in heat-exchange communication with said pushrods.

12. The apparatus of claim 11, further comprising means for mechanically adjusting said pushrods, in engagement with said pushrods.

13. The apparatus of claim 8, wherein said heat exchange jacket is made of a beryllium alloy.

14. The apparatus of claim 11, wherein said heating means are disposed within said pushrods.

15. An apparatus comprising a main body comprising a lip deformable by physical pressure and forming an extrusion exit opening; a plurality of spaced-apart, thermally-responsive pushrods operatively arranged in engagement with said lip to provide localized adjustment of said exit opening, and heating means disposed within said pushrods; and in heat-exchange communication with said heating means, a thermally conductive, heat exchange jacket; and heat pipe means disposed at least partially within said heat exchange jacket wherein an insulating member is disposed between said heat exchange jacket and said main body, wherein said heat pipe means are disposed on an opposite side of said heating means from said insulating means, and wherein said heat exchange jacket comprises an uninsulated exterior surface for release of heat.

16. The apparatus of claim 15, wherein said heat pipes are in the form of a plurality of channels disposed within said heat exchange jacket, containing a heat-exchanging, working fluid.

17. The apparatus of claim 15, wherein said heat exchange jacket is made of a beryllium alloy.

* * * * *